United States Patent [19]

Tong

[11] Patent Number: 4,567,016
[45] Date of Patent: Jan. 28, 1986

[54] VENTING MEANS FOR NUCLEAR REACTORS

[76] Inventor: Long S. Tong, 9733 Lookout Pl., Gaithersburg, Md. 20879

[21] Appl. No.: 507,464

[22] Filed: Jun. 24, 1983

[51] Int. Cl.[4] .............................................. G21C 9/00
[52] U.S. Cl. .................... 376/283; 376/378; 376/379
[58] Field of Search ..................... 376/283, 378, 379

[56] References Cited

U.S. PATENT DOCUMENTS

| | | | |
|---|---|---|---|
| 3,290,222 | 12/1966 | Schoessow et al. | 376/282 |
| 3,454,466 | 7/1969 | Pitt | 376/283 |
| 4,022,655 | 5/1977 | Gaouditz et al. | 376/283 |

Primary Examiner—Donald P. Walsh
Attorney, Agent, or Firm—T. K. Sung

[57] ABSTRACT

The present invention is related to nuclear reactors. More specifically, this invention is directed to a means for venting pressurized water reactors.

8 Claims, 3 Drawing Figures

VENTING MEANS FOR NUCLEAR REACTORS

BACKGROUND OF THE INVENTION

In the event that there is a small break in the piping for the coolant and consequently loss of coolant in a conventional pressurized water reactor, the pressurized water evaporates and overheats the core, and thus it forms a steam and gas bubble in the upper head. To remove this steam and gas bubble, it has been suggested to place an external vent in the upper-most part of the vessel head. A tube is connected to the vent to lead the steam away from the vessel head. However, placing such a vent in the head portion presents three difficulties. Firstly, the vessel head is fitted with many control rods which make access to the vent extremely difficult. Secondly, should the tube connected to the vent break, because of the high pressure within the vessel, the broken tube will "whip" which may damage the control rod driving mechanisms to cause an enormously difficult problem. Thirdly, the installation of such an external vent assembly in the vessel head increases the time in refueling since the vent must be disassembled and then reassembled to return to normal operation. For these reasons, commercial operators of nuclear reactors have disliked the idea of placing a vent at the top of the vessel head. From the above description, it is clear that a means for safely and conveniently venting a pressurized water reactor without placing an external vent on the vessel head of the reactor is needed.

SUMMARY OF THE INVENTION

The present invention provides a device for internally venting a pressurized water reactor without placing an external vent through the wall of the upper head of the reactor. According to the present invention, a conduit having one end disposed within the vessel upper head and the other end connected to a high pressure container outside the reactor is used to vent the pressurized water reactor, the conduit not passing through the wall of the upper head of the vessel. In one embodiment of this invention, the conduit passes through the side wall of the reactor. In another embodiment of this invention, the conduit passes through the hot leg nozzle of the reactor.

DETAILED DESCRIPTION OF THE INVENTION

Figure 1:
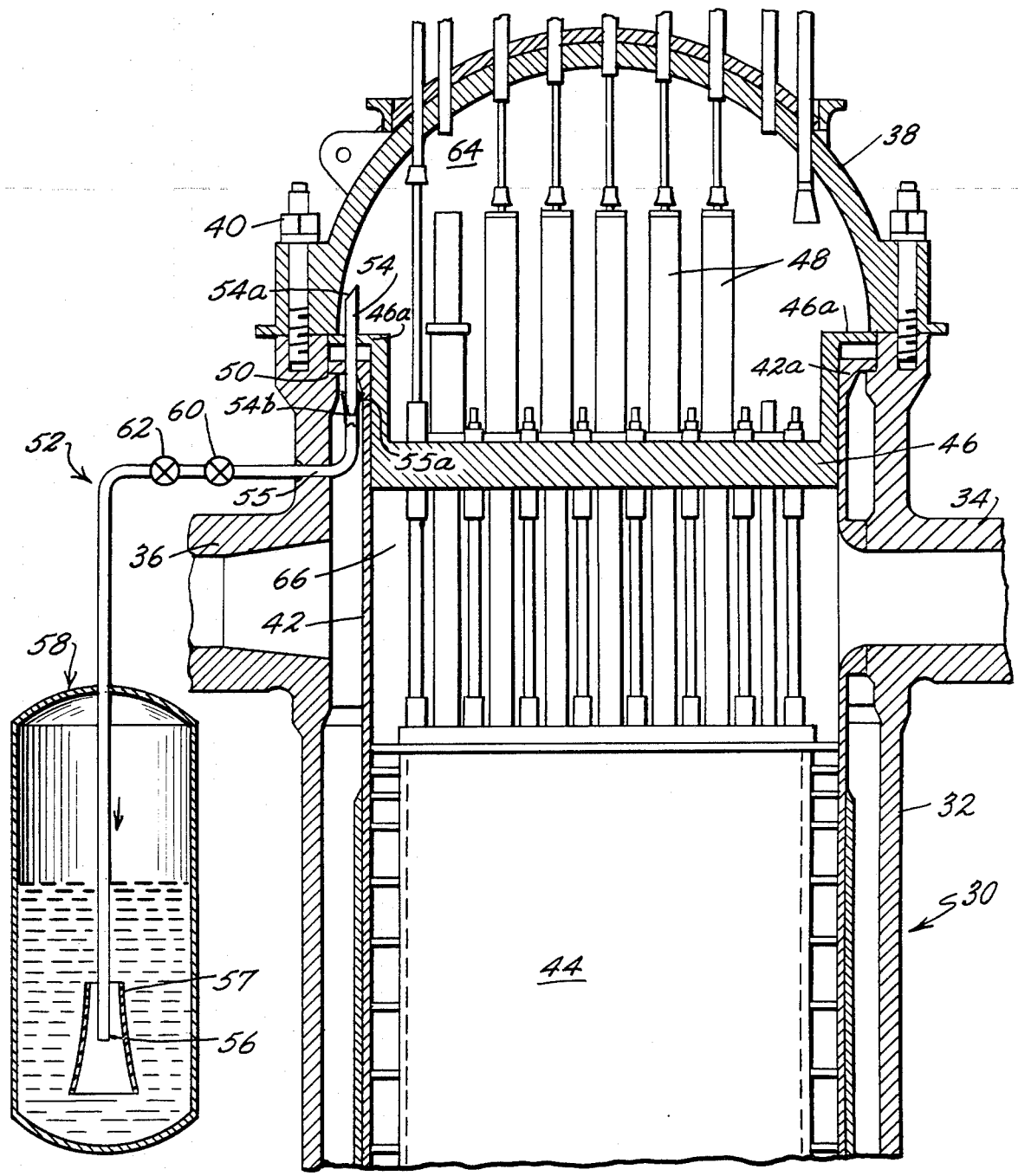
FIG. 1 shows the cross sectional view of one embodiment of the internal venting means.

As mentioned above, this invention provides an internal vent for a pressurized water reactor. The present vent comprises a conduit having one end disposed within the upper head of the reactor vessel. The other end of the conduit is connected to a high pressure container outside the reactor. The conduit passes through either the wall of the reactor vessel or the hot leg nozzle. In either case, the conduit does not pass through the wall of the upper head of the reactor vessel.

The present venting means permits the quick depressurization of a nuclear reactor so that a sudden reduction of coolant pressure in the core will evaporate the core coolant to enhance emergency core cooling and to generate void for scramming the reactor. Scram action by fast venting can serve as an alternate scram mechanism in case of a failure of the existing control rod driving mechanisms.

In addition, the present venting means prevents flooding in the reactor containment building which will occur when the rupture disk in conventional low pressure quench tanks is ruptured. Since a high pressure container is used in connection with the present invention, such flooding is prevented.

Moreover, the condensate collected in the high pressure container can be pumped back into the reactor as a recirculating emergency core cooling system.

The present invention is described in detail below and with reference to the drawings wherein identical reference numerals are used to designate the same parts.

With reference to FIG. 1, which illustrates the upper end of a pressurized water reactor, numeral 30 refers generally to the reactor. The reactor vessel comprises a vertical section 32 having inlet nozzle 36 and outlet nozzle 34 and a removable vessel head 38 attached to the vessel by means of nuts and bolts 40. Inlet and outlet nozzles are for the passage of coolant through the vessel. Placed within the vessel is core barrel 42 which supports the weight of reactor core 44. Upper support plate 46 is also placed within the vessel 30 for supporting a plurality of control rods 48. As shown in FIG. 1, control rods 48 pass through the vessel head 38. Upper support plate 46 and core barrel 42 have flange portions 46a and 42a respectively. Flange portion 46a and 42a engage ledge 50 in the interior wall of reactor vessel 32.

Internal vent conduit generally designated as 52 comprises two parts, straight portion 54 and connection portion 55. One end 54a of straight portion 54 is disposed within upper head 38. The other end 54b is loosely fitted into flared or funnel shaped end 55a of connecting portion 55. The other end 56 of connecting portion 55 is connected to a jet pump 57 placed within high pressure container 58. Although it is described herein that vent conduit 52 preferably comprises two parts, it is understood that conduit 52 can be formed from a single pipe or tubing. The two part construction for conduit 52 is preferred since it is easier and more convenient to fit. Conduit 52 has a diameter which will generate sufficient void in reactor 30 so as to shutdown the reactor when it is necessary. As shown in FIG. 1, conduit 52 passes through flange portions 46a and 42a and then through the wall of vessel 32. A pair of high pressure valves 60 and 62 are provided to prevent flow through conduit 52 when the reactor is operating under normal conditions. High pressure container 58 contains therein highly borated cold water for condensing the steam vented from reactor 30 in order to reduce the pressure therein. Container 58 is capable of withstanding pressures as high as about 2500 psia. The condensate in vessel 58 may be returned to reactor 30 to replenish the coolant therein. To maintain a high pressure in reactor 30, the penetration through which vent conduit 52 passes is welded closed securely.

In the event of a small break for loss of coolant, a steam bubble collects in the upper head region 64 and upper plenum region 66 in the reactor. To remove the bubble, valves 60 and 62 are opened. Thus, there is described an internal vent for a pressurized water reactor which generates sufficient void to shutdown the reactor.

Figure 2:
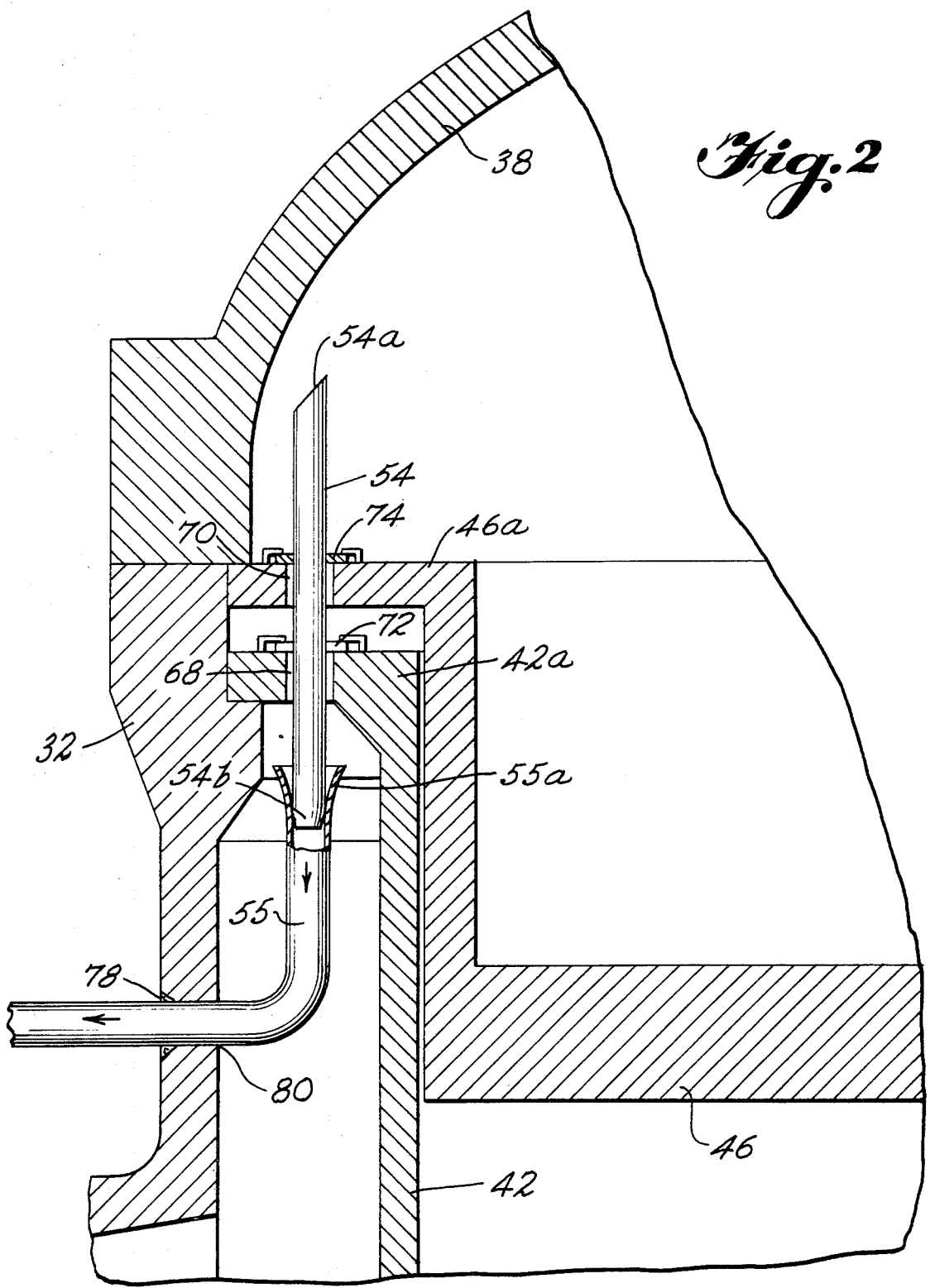
FIG. 2 shows the cross sectional view of the detail design of the embodiment of FIG. 1.

In FIG. 2, flange portions 42a and 46a for core barrel 42 and upper support plate 46 are provided with openings 68 and 70, respectively. Openings 68 and 70 have a diameter sufficiently large for straight portion 54 to pass through. Preferably, to facilitate insertion of straight portion 54, the diameter of openings 68 and 70 are about half-inch larger than the outside diameter of straight portion 54. To reduce flow bypass of the coolant when the reactor is in operation, gaps between straight portion 54 and openings 42a and 46a are covered by shiftable seal plates 72 and 74, respectively.

As illustrated in FIG. 2, one end 54a of straight portion 54 is placed within upper head 38. The other end 54b of straight portion 54 which is slightly tapered is inserted into flared or slightly funnel-shaped connecting portion 55. Thus, it is readily seen that the internal vent conduit is divided into at least two parts in this embodiment, the straight portion 54 and the connecting portion 55. By using a slightly divergent funnel 55a for fitting straight portion 54b, it would be much simpler and easier to install straight portion into the reactor. Connecting portion 55 penetrates the pressure vessel wall 32 at 78 and 80. To maintain the pressure within reactor 32, the penetration point 78 is welded securely. As mentioned above, holes 68 and 70 in the flanges of core barrel 42 and upper support plate 76 are larger than the conduit 54 so as to allow easy alignment of conduit 54 into holes 68 and 70. Connecting portion 55 is connected to a high pressure container (not shown) containing borated water to condense the steam which can be recirculated into the reactor.

In another embodiment of this invention, the vent conduit does not penetrate the wall of the reactor vessel. According to this embodiment, which is illustrated in FIG. 3, instead of penetrating the wall of the reactor, the vent conduit passes through the coolant exit nozzle, often referred to in the art as the "hot leg".

Figure 3:
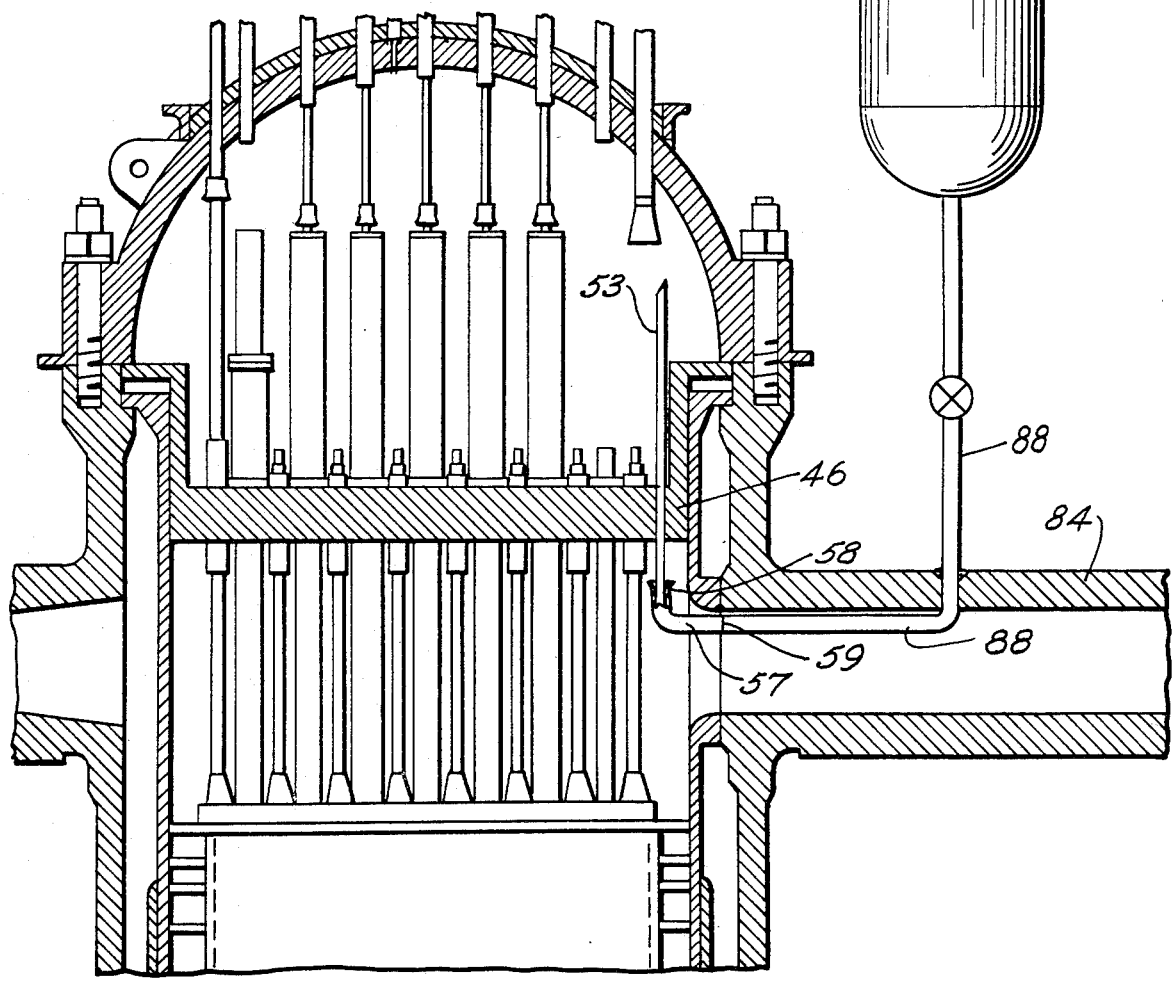
FIG. 3 shows the cross sectional view of another embodiment of the internal venting means.

In FIG. 3, conduit 53 passes through the upper support plate 46. The conduit 53 has a shoulder which is rested on the top of upper support plate 46. Conduit 53 is inserted into the slightly funnel-shaped opening of the first L-shaped conduit 57, of which the other end is loosely connected to the second L-shaped conduit 88. As shown in FIG. 3, joint 59 between conduits 57 and 88 is loose, with the ends of the two conduits being placed closely adjacent to each other. Conduit 88 passes through the hot leg wall 84 and is connected to pressurizer 82 outside the reactor. The outlet of pressurizer 82 is controlled by power operated relief safety valve 86. The point of penetration of 88 in hot leg wall 84 is welded securely so as to keep reactor 30 pressure tight.

In all of the above described embodiments, the diameter of the vent conduit can be varied according to need. In general, a conduit having a diameter of abour six to twelve inches is acceptable.

Thus, there is described a means of venting a pressurized water reactor internally without placing an external vent in the upper head of the reactor vessel. Thus, during refueling, the vessel head can be easily removed without the worry of disassembling and reassembling the vent. By using the internal vent of the present invention, a pressurized water reactor can be depressurized quickly in the event there is a steam or gas bubble in the upper head of the reactor. The present internal vent eliminates the inherent disadvantages of connecting a vent tube to the vessel head of a pressurized water reactor.

I claim:

1. In a pressurized water reactor comprising a pressure vessel having a removable upper head attached to the top thereof with at least one pair of coolant inlet and outlet nozzles, the improvement comprising an internal venting conduit having one end disposed inside the space defined by said upper head, and the other end being connected to a high pressure container outside said reactor, the conduit passing through the wall of the pressure vessel or outlet nozzle of the reactor.

2. The reactor according to claim 1 wherein the conduit passes through the side wall of said pressure vessel.

3. The reactor according to claim 1 wherein the conduit passes through the outlet nozzle and the hot leg wall.

4. The reactor according to claim 2 wherein the conduit comprises two parts, a straight part and a connecting part, said straight part passing through the flanges of core barrel support and upper support plate for said reactor and having a first end disposed within the upper head of the reactor vessel and a second end connected to first end of the connecting part, the second end of the connecting part being connected to said outside high pressure container, the connecting part passing through the wall of the vertical pressure vessel.

5. The reactor according to claim 3 wherein the conduit comprises three parts, a straight part, a first L-shaped part and a second L-shaped part, said straight part passing through the upper support plate and having one end disposed within the upper head of the reactor vessel and the other end being connected to one end of the first L-shaped part, the other end of the first L-shaped part being loosely connected to one end of the second L-shaped part, the other end of the second L-shaped part being connected to the high pressure container, the second L-shaped part passing through the wall of the hot leg.

6. The reactor of claim 4 wherein the first end of the L-shaped part is in the shape of a funnel into which the second end of the straight part is loosely fitted.

7. The reactor of claim 4 wherein the penetration points through the flanges of the core barrel and upper support plate are sealed by means of seal plates.

8. The reactor of claim 5 wherein the end of the first L-shaped part into which the end of the straight part is inserted is flared.

* * * * *